Feb. 9, 1926.

D. S. McPHAIL ET AL

ROLLER BEARING

Filed Dec. 13, 1923

1,572,736

Fig.1ª

Inventors.
D. S. McPhail
J. E. Pastorius,
By Egerton R. Case
Atty.

Patented Feb. 9, 1926.

1,572,736

UNITED STATES PATENT OFFICE.

DUNCAN STUART McPHAIL, OF DETROIT, MICHIGAN, AND JAMES EUSTA. PASTORIUS, OF KINGSVILLE, CANADA.

ROLLER BEARING.

Application filed December 13, 1923. Serial No. 680,487.

*To all whom it may concern:*

Be it known that we, DUNCAN STUART MCPHAIL, a United States citizen, and JAMES EUSTACE PASTORIUS, a subject of the King of Great Britain, residing, respectively, in the city of Detroit, State of Michigan, United States of America, and in the town of Kingsville, county of Essex, Province of Ontario, Canada, have invented certain new and useful improvements in Roller Bearings, of which the following is a specification.

Our invention relates to improvements in roller bearings, and the principal object of our invention is to design a bearing of this class which will take up end thrust as well as radial thrust, and one in which there will be no possibility of one end of any of the rollers moving in advance of the other end, in other words, to avoid creeping. Another object of our invention is to adapt the principle of our bearing for use in connection with all classes of machinery, and in the following specification we shall describe a disclosure within our invention, and a modification thereof, and what we claim as new will be set forth in the claim forming part of this specification.

Figure 1:
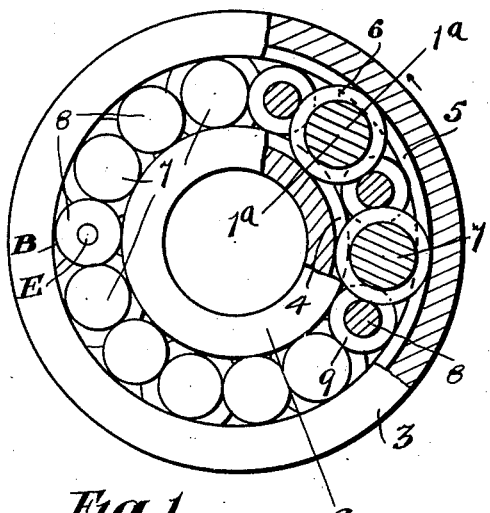
Figure 4:
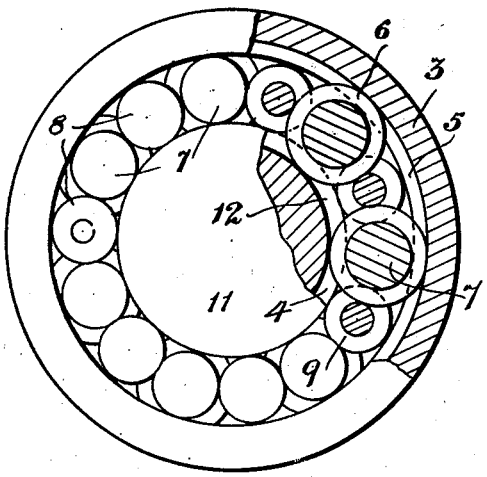
Figure 2:
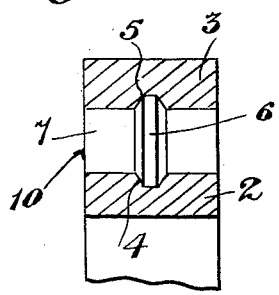
Figure 2:
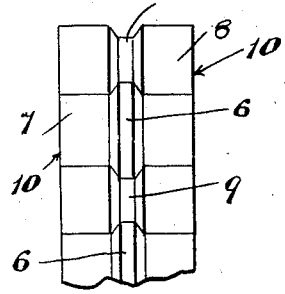
Figure 3:
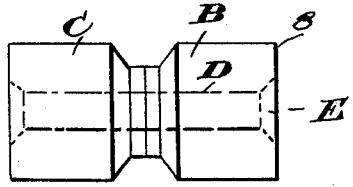
Figure 5:
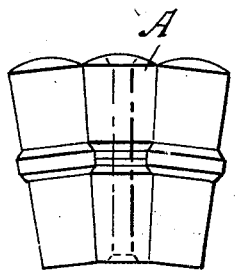

Fig. 1 is an end elevation of our preferred form of roller-bearing, certain portions being shown in section to illustrate internal construction. Fig. 1ᵃ is a cross section on the line 1ᵃ—1ᵃ, Fig. 1. Fig. 2 is a side elevation of a number of rollers, showing the manner in which the male and female rollers co-act. Fig. 3 is a side elevation showing the preferred form of construction for one of the female rollers known as the key roller. Fig. 4 is an end elevation of our preferred form of roller-bearing, mounted for use on a line shaft, certain portions being shown in section to illustrate internal construction, and Fig. 5 is a view similar to Fig. 2, showing our rollers tapered in form.

In the drawings, like characters of reference, refer to the same parts.

Our roller-bearing is composed of an equal number of male and female rollers, alternately disposed, and since it is not germane to our invention, we are not disclosing any manner of mounting the bearing.

According to the disclosure in Fig. 1, 2 is the inner race, and 3 the outer race. These races are each centrally provided with a circumferential groove, of the same size and shape in cross section. The inner race is of course circumferentially provided with its groove 4, and the race 3 is centrally provided in its inner surface with a groove 5. These grooves of course may be of any desired shape in cross section, and of course must correspond in shape to the cross-sectional shape of the flange 6 with which each male roller 7 is centrally circumferentially provided. Each female roller 8 is centrally provided with a circumferential groove 9, the same shape in cross section as the flange 6, and it will be noted upon referring particularly to Fig. 1 that the said male and female rollers are alternately spaced so that the flange of each male roller will operate in the groove, in the adjacent female rollers. The depth of the flanges 6 is such that these flanges will extend into the grooves 4 and 5.

The diameter of the ends 10 of the rollers 7 and 8 is such that these rollers have a rolling contact with the inner surface of the race 3 and the outer surface of the race 2, and of course the flanges 6 have rolling contact with their respective grooves already referred to.

In assembling the bearings, the male rollers 7 are placed between the inner and outer races close together, and then they are afterwards separated and a female roller located between each pair of male rollers. The last roller to be positioned is necessarily a female roller, and of course this must be made separable, and after this roller has been positioned, these separable parts are suitably coupled together. According to the preferred construction, this female roller called the key roller, is made of two portions B and C, and through each of these portions extend a bore D, and through this bore is passed any suitable coupling means E in the form of a rivet.

Should it be necessary to remove any roller, the rivet E must of course be first removed from the female key roller, and then the two portions B and C can be lifted out to permit the removal of the other rollers.

In the disclosure made in Fig. 4, in place of the inner race 2 we show a line shaft 11 having circumferentially formed therein a groove 12.- This line shaft 11 performs all the functions performed by the inner race 2. This construction possesses obvious advantages since the inner race 2 in this particular location of the bearing is dispensed with, thus not only saving in material, but also saving in the size of the bearing and cost of manufacture.

In Fig. 5 we show that our male and female rollers may be constructed to have a tapered form. The female roller A of course is made separable in this shape of the rollers also.

From what has been disclosed in the drawings, and referred to in this specification, it is evident that by reason of the co-action between the grooves, and the flanges carried by the male rollers, this bearing will take up end thrust quite as effectually as radial thrust, and that there will be no possibility of any creeping.

While we have described what we consider to be the best embodiment within our invention, it must be understood that the principle thereof may be embodied in many different forms, and we desire not to be limited beyond the requirements of the prior art and the terms of our claim.

What we claim is:

A roller bearing structure comprising inner and outer race members having their adjacent faces formed with oppositely disposed circumferential grooves, and a plurality of roller members positioned between the race members and having the same axial length and the same diameter at their adjacent ends, said roller members having every alternate one formed with a centrally disposed peripheral groove of similar dimensions to the grooves in the race members, the remaining roller members having centrally disposed peripheral flanges received within the grooves of the last mentioned roller members and the grooves of the race members and similarly contacting with the walls of both.

DUNCAN STUART McPHAIL.
JAMES EUSTACE PASTORIUS.